United States Patent [19]
Ashburner

[11] 3,951,023
[45] Apr. 20, 1976

[54] TRANSPORT GUIDE FOR PLIABLE SHEET MATERIAL

[75] Inventor: Adi Kaikhushiroo Ashburner, Hargrave, England

[73] Assignee: Harper & Tunstall Limited, Wellingborough, England

[22] Filed: June 11, 1973

[21] Appl. No.: 368,665

[30] Foreign Application Priority Data
June 12, 1972 United Kingdom............... 27419/72

[52] U.S. Cl.................................... 83/110; 83/202; 83/205; 83/373; 83/439; 226/113; 355/13
[51] Int. Cl.².......................................... G03B 29/00
[58] Field of Search ............ 83/110, 203, 205, 202, 83/439, 440.1, 446, 447, 443, 373; 355/13, 28, 29; 226/113, 114

[56] References Cited
UNITED STATES PATENTS

| | | | |
|---|---|---|---|
| 3,245,330 | 4/1966 | Okishima.......................... | 355/13 X |
| 3,452,627 | 7/1969 | Goodman et al...................... | 83/110 |
| 3,639,053 | 2/1972 | Spear.................................... | 355/13 |
| 3,673,905 | 7/1972 | Kono ................................... | 83/175 |
| 3,779,641 | 12/1973 | Hauck................................... | 355/13 |

*Primary Examiner*—J. M. Meister
*Attorney, Agent, or Firm*—Woodhams, Blanchard and Flynn

[57] ABSTRACT

Apparatus for feeding a continuous web of photosensitive paper into a reprographic machine so that the leading edges of the paper and a transparent master sheet to be copied are coincident as they enter exposure and developing stations, and to ensure that the tail end of the paper is cut, during continuous forward movement of the leading edge, so that the trailing edge of the severed paper coincides with the tail end of the master sheet. The feed path of the paper includes a curved portion defined by an arcuate-section guide and a concentrically mounted roller. A loop of paper is formed by moving the roller out of the guide and the rear end of the paper is then held stationary and cut by a guillotine while the paper forming the loop is continuously fed forward. The timing of the feeding and cutting operations on the paper is controlled by micro-switches actuated by the leading and trailing ends of the master sheet.

23 Claims, 2 Drawing Figures

TRANSPORT GUIDE FOR PLIABLE SHEET MATERIAL

BACKGROUND OF THE INVENTION

The invention relates to a method and apparatus for guiding pliable sheet material so as to allow a forward portion of the sheet material to be continuously fed forward while a rear portion of the sheet material is stationary.

Apparatus such as this is of particular application in reprographic machines where the forward edge of a continuous strip of photo-sensitive copying paper is aligned with the forward edge of a master sheet before feeding the two forward edges into exposure and developing stations of the reprographic machine. As the reprographic processes normally involve continuous movement of the master sheet and registering copying paper through the machine, cutting the paper at a rear edge which will coincide with the rear edge of the master sheet must be effected while the forward edges of the master sheet and the copying paper are still moving.

In practice, rear edge cutting of the copying paper may be effected by forming the copying paper into a loop between the cutting means and the exposure and developing stations of the machine. The rear portion of the copying paper may then be held stationary and the rear edge cut while the forward edges of the copying paper and the master sheet move forward together and the loop is dissipated.

In one form of loop-forming feed apparatus suitable for use in reprographic machines, a master sheet and a continuous strip of copying paper are fed through converging paper guides into a common paper guide in which the two layers can be fed into the exposure and developing stations of a reprographic machine. A first sensing device disposed along the path of the master sheet detects the passage of the forward edge of the master sheet and is operable to initiate withdrawal of the copying paper from a rotatably mounted continuous roll and to feed the copying paper between upstream and downstream pairs of cooperating transport rollers so that the forward edge of the copying paper is moved into alignment with the forward edge of the master sheet at the junction of the converging paper guides and the two forward edges are fed together along the common paper guide.

A second sensing device disposed along the path of the master sheet, upstream of the first sensing device, then detects the passage of the rear edge of the master sheet and is operable to cause acceleration of the upstream pair of transport rollers engaging the copying sheet. Then, for a predetermined period, the downstream pair of transport rollers engaging the copying paper continue to rotate at a constant speed, consistent with the uniform motion of the forward edges of the master sheet and the copying paper, while the upstream pair of rollers rotate at a higher speed to form a loop of copying paper between the two pairs of transport rollers. The upstream pair of transport rollers is then stopped and a stationary rear portion of the copying paper held by the upstream pair of transport rollers is cut upstream of the two pairs of transport rollers while the downstream pair of transport rollers continue their rotation at constant speed so as to feed copying paper in the loop forward. The predetermined loop-forming period, in which the upstream and downstream pairs of transport rollers rotate at different speeds, is so controlled that the rear edge of the copying paper cut from the stationary rear portion of the sheet material will coincide with the rear edge of the master sheet.

This apparatus has the disadvantage that it involves the use of sophisticated and expensive means for controlling the rotation of the upstream pair of transport rollers so as to ensure that the rear edge of the piece of copying paper severed from the continuous strip of copying paper coincides precisely with the rear edge of the master sheet when these rear edges are brought together.

In an alternative type of loop-forming feed apparatus devised in order to avoid this disadvantage, the copying paper withdrawn from a rotatably mounted continuous roll is fed between upstream and downstream pairs of cooperating transport rollers. As before, the master sheet and the copying paper are fed along converging paper guides to a common paper guide extending from the junction of the converging paper guides, and the feed of the copying papers is initiated in response to the operation of the first sensing device which detects the passage of the leading edge of the master sheet. However, before the forward edge of the copying paper reaches the junction of the converging paper guides, the downstream pair of transport rollers is stopped so that a loop of copying paper is formed between the upstream and downstream pairs of transport rollers as a result of the continued rotation of the upstream pair of transport rollers. The downstream pair of transport rollers is then restarted in response to the passage of the forward edge of the master sheet past a second sensing device disposed along the path of the master sheet, downstream of the first sensing device, so that the forward edge of the copying paper is moved into alignment with the forward edge of the master sheet when these two forward edges reach the junction of the converging paper guides.

The copying paper is cut upstream of the two pairs of transport rollers when the upstream pair of transport rollers has been stopped in response to the passage of the rear edge of the master sheet past the first sensing device. The rear portion of the copying paper held stationary between the upstream pair of transport rollers is cut at any time up to and including the moment when the copying paper extending between the two pairs of transport rollers is drawn taut as a result of the continuous rotation of the downstream pair of transport rollers, but is preferably effected before the loop of this copying paper has been dissipated.

Thus, although this form of feeding apparatus avoids the use of complex timing and accelerating means, it still requires the use of relatively complicated and powerful means for stopping and starting the downstream pair of transport rollers.

SUMMARY OF THE INVENTION

It is an object of the present invention to guide pliable sheet material in such a way that the rear portion of the sheet material may be held while the forward portion is still moving, without the use of variable speed transport rollers which must be intermittently accelerated or stopped and restarted in order to form a loop in the sheet material.

According to the invention, there is provided a method of guiding pliable sheet material so as to allow a forward portion of the sheet material to be continuously fed forward while a rear portion of the sheet material is stationary, the method comprising the steps of guiding the forward portion through a transport guide which defines a first, non-rectilinear path and adjusting the transport guide so as to allow the sheet material to follow a second, shorter path while the rear portion is held stationary.

It is to be understood that after adjustment of the transport guide, the transport guide may be re-adjusted to its initial condition so as to define the first path once again.

By halting the rear portion of a sheet material which is guided in this manner, on or after adjustment of the transport guide, it is possible to provide a method of feeding a pliable sheet material so that a forward portion of the sheet material is continuously fed forward while a rear portion of this material is held stationary. The rear portion of the pliable sheet material which is held stationary may then be subjected to mechanical operations such as cutting, stamping and embossing.

Where the transport guide has two guide surfaces which cooperate to define the first path between the two pairs of transport rollers, adjustment of the transport guide may be effected by separating these two guide surfaces. This separation may be effected by lateral bodily movement or by rotational movement about a pivotal axis of one or each guide surface.

The invention also provides a transport guide for guiding pliable sheet material so as to allow a forward portion of the sheet material to be continuously fed forward while a rear portion of the sheet material is stationary, the transport guide defining a first, non-rectilinear path for the sheet material, and having adjusting means for adjusting the transport guide so as to allow the sheet material to follow a second, shorter path while the rear portion is held stationary.

A transport guide such as this may form part of a feed apparatus including first and second sheet material feeding means respectively disposed upstream and downstream of the transport guide, and means operable on or after adjustment of the transport guide for stopping the first feeding means so as to halt the rear portion of sheet material while the second feeding means continue feeding movement of the forward portion. The sheet material feeding means may be conveniently provided in the form of pairs of cooperable, counter-rotating rollers.

It is also possible to use the transport guide, or feed apparatus incorporating the transport guide, to provide a severing apparatus for cutting a stationary rear portion of a pliable sheet material while a forward portion of the sheet material is moving continuously forward. In such severing apparatus, cutting means disposed at a fixed point in the first path are operable to cut the rear portion on or after adjustment of the transport guide. Where the severing apparatus includes first and second sheet material feeding means respectively disposed upstream and downstream of the transport guide, operation of the cutting means is deferred until the first feeding means has been stopped.

Preferably, the cutting means and the adjusting means are connected by coupling means for concurrent operation.

In a preferred form of transport guide, two separable guide surfaces cooperate to form at least part of the first path of the pliable sheet material, and the adjusting means are operable to separate the two guide surfaces. Clearly, only one of the guide surfaces needs to be movable. Where severing apparatus incorporating such a transport guide includes cutting means having two relatively movable blade elements, a movable blade element may be directly coupled to a movable guide surface so as to ensure concurrent operation of the adjusting means and the cutting means.

Where only one guide surface is movable, this surface may be a curved surface and is preferably in the form of a single convex surface which may be bodily moved in a lateral direction away from the fixed guide surface, or may be rotated away from the fixed surface about a pivotal axis. However, where one of the guide surfaces is capable of such movement, the other guide surface may also be arranged for bodily lateral movement or pivotal movement.

A curved surface having only one convex portion may be part-cylindrical in shape and, where this guide surface forms part of a complete cylinder, the cylinder may be rotatable so that the cylinder surface adjacent to the cooperating guide surface is movable in the same direction as the sheet material.

Conveniently, the two guide surfaces substantially conform to each other so as to provide a substantially uniform width gap between the guide surfaces when the guide surfaces are not separated.

DESCRIPTION OF THE DRAWINGS

A diazo copying machine embodying feed apparatus according to the present invention and its method of operation are hereinafter described, by way of example only, with reference to the accompanying drawings, in which.

DESCRIPTION OF THE PREFERRED EMBODIMENTS

Figure 1:
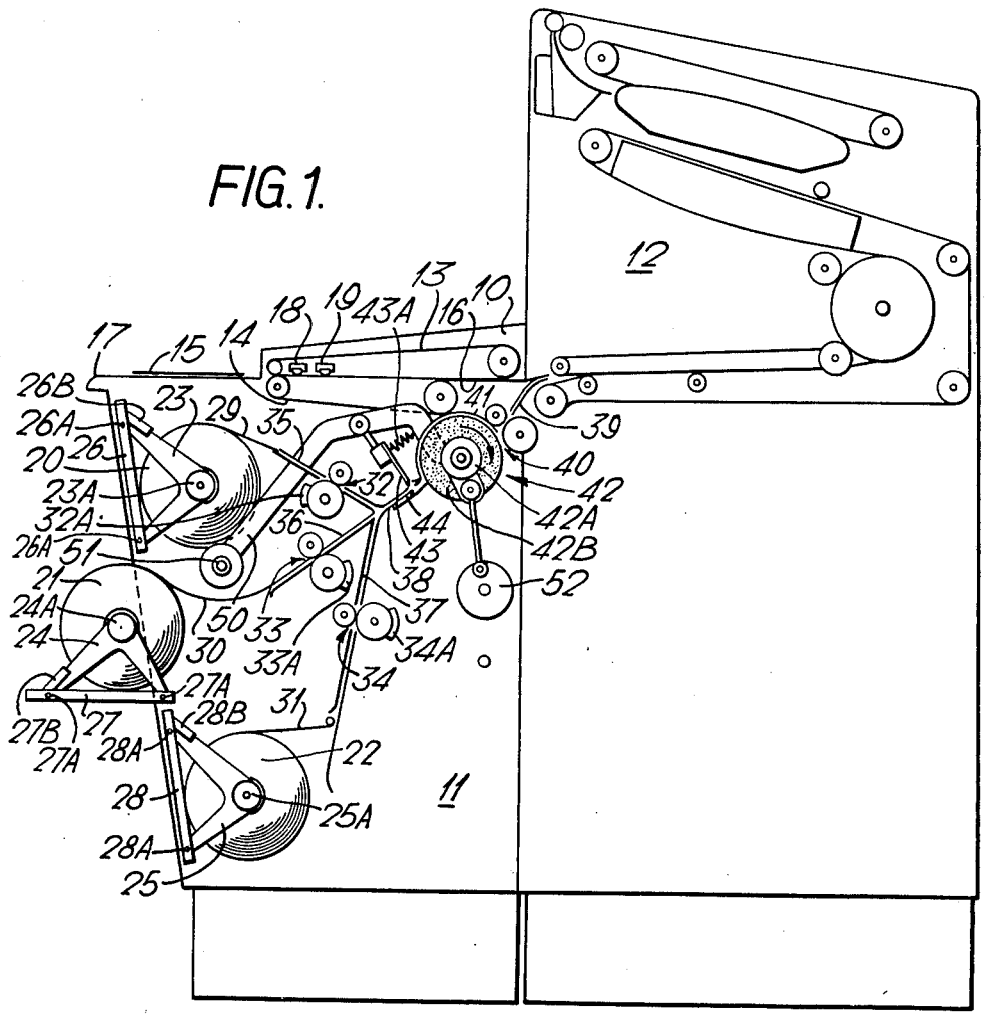
FIG. 1 is a schematic sectional elevation of the machine.

The diazo copying machine shown in FIG. 1 consists of a master sheet feed apparatus 10, a copying paper feed apparatus 11, and a conventional exposure and developing apparatus 12.

The master sheet feed apparatus 10 includes upper and lower endless belt conveyors 13 and 14 arranged so that adjacent lengths of the endless belts of the conveyors 13 and 14 are engageable with a master sheet 15 fed between these endless belts, and cooperate with an aligned flat surface 16 to provide a guide for the master sheet 15.

A master sheet 15 is rested on a platform 17, and during operation of the conveyors 13 and 14, is fed between the endless belts and into the exposure and developing apparatus 12. Two micro-switch sensing devices 18 and 19 are mounted above the master sheet guide so as to sense the passage of the forward and rear edges of the master sheet 15.

Three rolls 20, 21, 22 of continuous diazo-coated paper strip, of different widths, are respectively mounted for rotation on three pairs of brackets 23, 24, 25 mounted on three pivotable panels 26, 27, 28. Each of the brackets of the pairs 23, 24 and 25 is provided with a freely rotatable, roughened frusto-conical hub 23A, 24A and 25A for insertion within the hollow cardboard core of one of the rolls 20, 21, 22. One of the brackets of each pair is fixed at one side of the paper feed apparatus 11 and the other bracket of each pair is slidable along two guide rods 26A, 27A, 28A and provided with locking means 26B, 27B, 28B for locking the movable bracket in engagement with the ends of the different length rolls 20, 21, 22. Paper strips 29, 30, 31 from the rolls 20, 21, 22 are respectively passed between pairs of cooperating driving rollers arranged in counter-rotatable pairs 32, 33, 34 disposed in three mutually converging branches 35, 36, 37 of a transport guide which converges with the flat sheet 16 forming the master sheet guide.

The transport guide has two spaced portions 38 and 39 respectively leading from the junction between the branches 35, 36, 37 and leading to a junction with the flat surface 16 forming the master sheet guide. A guillotine and a further pair of counter-rotatable transport rollers 40 are mounted in the gap provided between upstream and downstream portions 38 and 39 of the transport guide, and a curved portion of the transport guide extends between the guillotine and the further pair of transport rollers 40.

The curved portion of the transport guide consists of a fixed curved plate member 41 and a rotatable roller 42, the plate member 41 and the roller 42 conforming in shape so as to provide a substantially uniform width gap which defines the curved paper guide.

A movable blade 43 of the guillotine mounted on cranked levers 50 carrying the movable roller 42 and supported by a compression spring 43A is cooperable with a fixed blade 44 of the gullotine to shear paper extending from the upstream portion 38 of the transport guide.

The ends of the shaft 42A of the roller 42 are supported on the cranked levers 50, which are pivotable about spindles 51, and connected to an eccentric drive 52 which is operable to withdraw the roller 42 from the plate 41.

To reduce inertia, the roller 42 consists of a plurality of annular section bands 42B of foamed plastics material mounted on the shaft 42A.

In operation, when a master sheet is fed from the platform 17 to the exposure and developing apparatus 12 of the machine, the passage of the forward edge of the master sheet 15 is detected by the upstream microswitch 18 and generates a signal which is effective to commence rotation of one of the driving rollers 32, 33, 34, and the further pair of transport rollers 40. The driving roller 32, 33 or 34 which is rotated is preselected in accordance with the width of the copying paper required to match the width of the master sheet. This pre-selection is effected by conventional means.

The strip of copying paper 29, 30 and 31 is withdrawn from a continuous roller 20, 21, 22 by the corresponding driving roller 32, 33, 34 from the upstream portion 38 of the transport guide, through the curved portion of the transport guide, between the further pair of transport rollers 40 and through the downstream portion 39 of the transport guide. The path of the forward edge of the copying sheet is so arranged that this edge coincides with the forward edge of the master sheet when these two forward edges meet at the junction of the master sheet guide 16 and the transport guide 39 so that the master sheet and copying paper are fed together into the exposure and developing apparatus 12 of the machine.

When the downstream micro-switch 19 senses the passage of the rear edges of the master sheet, this micro-switch generates a signal which is effective to stop rotation of the corresponding pair of upstream driving rollers 32, 33 and 34, by means of locking means shown schematically as brake pads 32A, 33A and 34A, which signal also is effective to energize eccentric drive 52 so as to move the movable blade 43 across the fixed blade 44 so as to sever the copying paper which is being fed by the downstream pair of transport rollers 40 from the remainder of the copying paper in the upstream portion 38 of the transport guide. Movement of the movable blade 43 is accompanied by a concurrent movement of the movable curved face roller 42 so as to form a collapse loop of copying paper within the curved portion of the transport guide. On continued rotation of the downstream pair of transport rollers 40, this loop of copying paper is dissipated as the copying paper is fed into the exposure and developing apparatus 12 of the machine, and this cutting operation is so timed that the rear edge of the severed portion of the copying paper coincides with the rear edge of the master sheet 15 when these two rear edges meet at the junction of master sheet guide and the transport guide. The master sheet and the severed portion of copying paper then pass through the exposure and developing apparatus 12 of the machine and emerge together. The printed copying sheet is then separated from the master sheet.

Clearly, the size of the collapsible loop of paper formed in the curved portion of the transport guide will always be the same, regardless of the rate at which paper is fed into the exposure and developing apparatus 12. This means that the time taken for the dissipation of this loop will be inversely proportional to the speed of the paper. To ensure that the cutting operation is completed by the time that the collapsible loop has been dissipated, the movable roller 42 and the movable blade 43 are driven at a speed which is directly proportional to the speed of the copying paper.

It is to be understood that although the above described embodiment includes feed apparatus capable of supplying continuous paper strips from three different width rolls 20, 21, 22, only one such roller is necessary although a different number may be provided. Clearly, where the width of the paper strip in the or each roll differs from the width of the master sheet, the printed copying paper will have to be trimmed on its side edges so as to correspond to the width of the master sheet. Moreover, where it is desired to cut the copying paper so that it does not conform precisely to the length of the master sheet 15, the micro-switches 18 and 19 may be mounted for longitudinal movement along master sheet feed apparatus 10.

Figure 2:
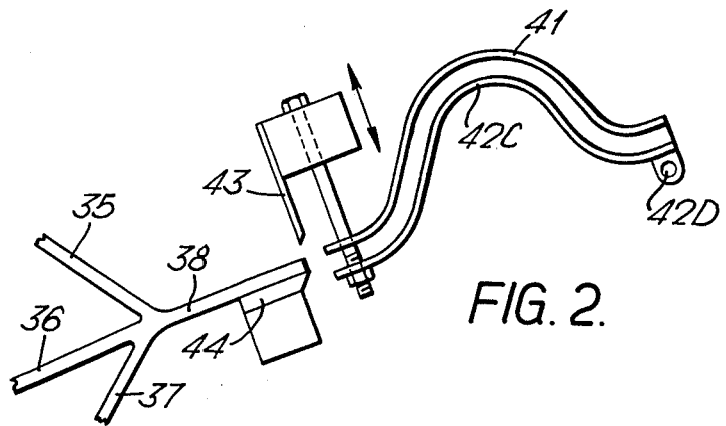
FIG. 2 is an elevation of part of the apparatus shown in FIG. 1, but incorporating a constructional modification.

In the modified construction shown in FIG. 2, where like parts have been assigned the same reference insignia as in FIG. 1, the member providing the movable surface of the transport guide is a curved plate 42C of similar shape to the fixed plate 41. As described with reference to the embodiment described with reference to FIG. 1, the movable blade 43 of the guillotine may be connected to cranked levers (such as levers 50 in FIG. 1) and connected to the plate 42C to cause shearing of the copying paper on movement of the plate 42C. As shown, the plate 42C is pivotally mounted at its end remote from the movable blade, and swings about a fixed pivot 42D.

I claim:

1. Reprographic apparatus for reproducing marking on a master sheet onto a sheet of photo-sensitive pliable sheet material, comprising:
   an exposure and developing means;
   transport guide means for guiding the pliable sheet material so as to allow a forward portion of the pliable sheet material and the master sheet to be continuously fed forward into the exposure and developing means while a rear portion of the sheet material is maintained stationary, said transport guide means including loop forming means coacting with said sheet material for forming a loop of a preselected size in said sheet material;

said loop forming means including a pair of opposed guide members defining a predetermined non-linear first path therebetween which results in formation of said loop when said sheet material is fed between said guide members, said loop being closely confined on opposite sides thereof by said guide members;

said transport guide means also including means for holding the rear portion of said sheet material stationary; and drive means connected to one of said guide members to positively displace said one guide member in a direction permitting reduction in the size of the loop so that the intermediate portion of the sheet material follows a second shorter path while the rear portion is maintained stationary, said drive means causing positive displacement of said one guide member independently of the tension in said sheet material.

2. An apparatus according to claim 1, including cutting means disposed at a fixed point in the sheet material path and operable to cut the rear portion of the sheet material upon displacement of said one guide member in said direction while the rear portion is held stationary.

3. An apparatus according to claim 2, comprising first and second sheet material feeding means respectively provided upstream and downstream of the transport guide means.

4. An apparatus according to claim 2, including coupling means connecting the cutting means and the drive means for concurrent operation upon displacement of said one guide member in said direction.

5. An apparatus according to claim 4, in which the drive means is operable to separate the two guide members, and in which two relatively movable blade elements constitute the cutting means and one said blade element is directly connected to said one guide member.

6. Reprographic apparatus according to claim 1, including sheet feeding means for feeding the master sheet into the exposure and developing means, and first and second sheet feeding means respectively disposed upstream and downstream of the transport guide means for the photo-sensitive pliable sheet material, and cutting means coupled to the means for holding the rear portion stationary and to the drive means so that the trailing edge of the sheet material fed to the exposure and developing means are coincident.

7. An apparatus according to claim 1, including sensor means for monitoring the movement of the master sheet to control the movement of the sheet material so that the master sheet and the sheet material are fed into the exposure and developing apparatus with their leading edges coincident, and to control the operation of the drive means.

8. An apparatus according to claim 1, in which the two guide members define separable guide surfaces which cooperate to define said first path therebetween, and said drive means being operable to separate the two guide surfaces.

9. An apparatus according to claim 8, including mounting means for mounting said one guide member to permit pivotal movement thereof to effect separation of said guide members.

10. An apparatus according to claim 8, in which the drive means is connected so as to move only said one guide member, the other guide member being maintained substantially stationary.

11. An apparatus according to claim 10, in which said one guide member is curved.

12. An apparatus according to claim 11, in which said one guide member has a single convex guide surface formed thereon.

13. An apparatus according to claim 12, in which said one guide member is part cylindrical in shape.

14. An apparatus according to claim 12, in which said one guide member comprises a cylindrical roll having its outer cylindrical surface defining said guide surface.

15. An apparatus according to claim 14, in which said cylindrical roll is mounted for rotation about its axis so that the cylindrical peripheral surface thereof is movable in the same direction as the sheet material, and said other guide member having a stationary guide surface thereon disposed opposite the peripheral cylindrical surface of said roll.

16. An apparatus according to claim 1, in which the two guide members have opposed guide surfaces which substantially conform to one another to provide a substantially uniform width gap therebetween prior to displacement of said one guide member in said direction.

17. An apparatus according to claim 1, wherein said pair of opposed guide members have opposed guide surfaces thereon which are disposed closely adjacent one another and define a narrow gap therebetween, one of said guide surfaces being convex and the other guide surface being concave, and the other guide member being maintained in a stationary position.

18. An apparatus according to claim 17, including two pairs of cooperating counter-rotatable rollers respectively comprising the first and second sheet material feeding means.

19. An apparatus according to claim 17, including at least one freely rotatable roll of continuous pliable sheet material and a pair of brackets for supporting each said roll.

20. An apparatus according to claim 19, in which each freely rotatable roll has a hollow core and roughened frusto-conical hubs which are engageable within the hollow core and are rotatably mounted on the brackets.

21. An apparatus according to claim 19, in which there are at least two freely rotatable rolls of continuous pliable sheet material, separate first feeding means for the sheet material from each roll, and separate inlet branches for receiving sheet material from each roll and constituting part of the transport guide transporting means.

22. An apparatus according to claim 1, including first and second sheet material feeding means respectively provided upstream and downstream of the transport guide means, and said holding means being operable to stop the first feeding means so as to halt the rear portion of the sheet material upon displacement of said one guide member in said direction while said second feeding means continues feeding movement of the forward portion.

23. An apparatus according to claim 1, wherein said drive means includes a support member mounted for reciprocating movement, said support member having said one guide member fixedly mounted thereon, said drive means also including a movable driving member interconnected to said support member for causing reciprocating movement thereof, said other guide member being stationarily mounted.

* * * * *